Jan. 5, 1932.  M. RALL ET AL  1,840,277

RESILIENT GEAR

Filed Jan. 30, 1930

Inventors
Max Rall
Fritz Allendorff
by Steward + McKay
their attorneys

Patented Jan. 5, 1932

1,840,277

UNITED STATES PATENT OFFICE

MAX RALL AND FRITZ ALLENDORFF, OF STUTTGART, GERMANY, ASSIGNORS TO ROBERT BOSCH AKTIENGESELLSCHAFT, OF STUTTGART, GERMANY

RESILIENT GEAR

Application filed January 30, 1930, Serial No. 424,598, and in Germany February 21, 1929.

The present invention relates to resilient gears and is particularly applicable to the transmission gear of combined magneto ignition and electric lighting apparatus between the magneto part and the dynamo part. Great irregularities occur in the speed of the driving shaft of such apparatus when using a non-resilient drive, because the dynamo part rotates at a greater speed than the magneto part and irregularities of this kind lead to loosening and damage of the tooth wheels and of the rotor of the dynamo.

According to the present invention, a resilient gear comprises a shaft, a flanged member on said driving shaft having a cam surface formed thereon, a toothed gear member rotatably mounted on the driving shaft and having a cam surface formed thereon, rotatable bearing elements intermediate of the cam surfaces on said members and resilient means urging said members towards each other.

One form of construction of the invention is shown by way of example in the accompanying drawings, in which:—

Figure 1:
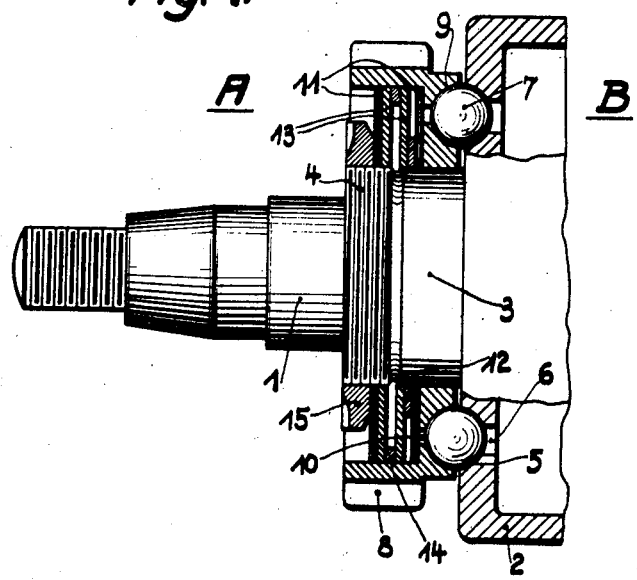
Figure 1 is a longitudinal section through a resilient tooth wheel coupling of a combined dynamo-magneto set.
Figure 2:
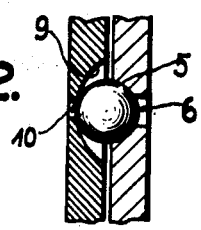
Figure 2 is a section on the line A B of Figure 1.

Secured to the driving shaft 1 of a magneto ignition and electric lighting apparatus is a rotor having a flange part 2. A thread 4 is cut on a boss 3 of the driving shaft. In the flange portion itself are four semi-spherical recesses 5, which are provided with lubricating holes 6, and receive steel balls 7.

A toothed wheel 8 rotatably mounted on the boss 3 of the driving shaft is annularly recessed on one side and four recesses 9 are formed in the other side thereof, which recesses are of the profile of the ball in radial section, while they are bevelled or elongated in the direction of the circumference of the toothed wheel. In the bottom of the recesses 9 are lubricating holes 10. In the hollow space of the tooth wheel 8 are arranged in series a fibre disc 11, a narrow steel ring 12, whose inner diameter is somewhat greater than the outer diameter of the boss 3, a steel plate spring 13, a narrow steel ring 14 which is applied to the inner diameter of the tooth wheel, a second steel plate spring 13 and a second fibre disc 11. These elements are secured on the boss 3 by means of a nut 15, which is screwed on to the threaded part 4 of the boss. The tooth wheel 8 is forced by this spring arrangement under the pressure of the plate springs 13 against the flange part 2.

Thus sudden changes in velocity and shocks, are not transmitted to the tooth wheel coupling, since the balls can be displaced circumferentially along the recesses 9 against the axial force of the spring disc 13.

It will be appreciated that by this invention very high resilient pressures can be obtained whilst retaining compactness of construction. Further, the invention can be very cheaply produced because the springs are of simple plate form, and especially in the form of construction shown, because cheap and accurate steel balls which are capable of resistance are adapted to be used as drivers.

We claim:

1. Resilient gear mechanism comprising a driving shaft, a flange on said driving shaft having recesses in one side face, a toothed gear member rotatably mounted on the shaft and having a cam surface formed on its side face adjacent the flange and an annular recess in the opposite side face, rotatable bearing elements between the flange and gear member engaging said cam surface and partially housed in said recesses in the flange, annular plate springs in the annular recess of the gear member, spacing rings engaging the side faces of the springs alternately at the inner and outer edges thereof, non-metallic rings engaging certain of the springs and an adjustable abutment on the shaft for loading said annular springs.

2. Resilient gear mechanism comprising a driving shaft, a flanged member on said driving shaft, a toothed gear member rotatably mounted on said driving shaft, rotatable ball bearing elements between said flanged and gear members and resilient means urging said members towards each other, one of said members having recesses therein of the same contour as said balls adapted to retain the ball elements in a fixed position relative thereto whilst the other member has recesses formed therein having a radial contour corresponding to the contour of said ball elements and a circumferential contour defined by a radius greater than the radius of said ball elements whereby said ball elements are maintained in a fixed radial position relative thereto but are permitted limited circumferential displacement, simultaneously with relative axial displacement of said flanged and gear members.

3. Resilient gear mechanism comprising a driving shaft, a flange on said driving shaft having recesses in one side face, a toothed gear member rotatably mounted on the shaft and having a cam surface formed on its side face adjacent the flange and an annular recess in the opposite side face, rotatable bearing elements between the flange and gear member engaging said cam surface and partially housed in said recesses in the flange, annular plate springs in the annular recess of the gear member, spacing rings engaging the side faces of the springs alternately at the inner and outer edges thereof, and an adjustable abutment on the shaft for loading said annular springs.

4. Resilient gear mechanism comprising a driving shaft, a flange on said driving shaft having recesses in one side face, a toothed gear member rotatably mounted on the shaft and having a cam surface formed on its side face adjacent the flange and an annular recess in the opposite side face, rotatable bearing elements between the flange and gear member engaging said cam surface and partially housed in said recesses in the flange, annular plate springs in the annular recess of the gear member, spacing rings engaging the side faces of the springs alternately at the inner and outer edges thereof, non-metallic rings engaging certain of the springs, and an adjustable abutment on the shaft for loading said annular springs, said flange and toothed gear having lubricating passages formed therein leading to the bottom of the recesses formed therein.

5. Resilient gear mechanism comprising a driving shaft, a flanged member on said driving shaft, a toothed gear member rotatably mounted on said driving shaft, rotatable ball bearing elements between said flanged and gear members and resilient means urging said members toward each other, one of said members having recesses therein of the same contour as said balls adapted to retain the ball elements in a fixed position relative thereto whilst the other member has recesses formed therein having a radial contour corresponding to the contour of said ball elements and a circumferential contour defined by a radius greater than the radius of said ball elements whereby said ball elements are maintained in a fixed radial position relative thereto but are permitted limited circumferential displacement simultaneously with relative axial displacement of said flanged and gear members, said flange and gear members having therein lubricating passages leading to the bottom of the recesses formed in said members.

In testimony whereof we have hereunto affixed our signatures.

MAX RALL.
FRITZ ALLENDORFF.